United States Patent [19]
Waldrop et al.

[11] 3,902,215
[45] Sept. 2, 1975

[54] DUAL PIPE WIPER MADE OF STACKED SINGLE WIPERS

[75] Inventors: Tom C. Waldrop, Arlington; Fred D. Rutledge, Weatherford, both of Tex.

[73] Assignee: Regal Tool and Rubber Co., Grapevine, Tex.

[22] Filed: Mar. 29, 1974

[21] Appl. No.: 456,261

[52] U.S. Cl.................. 15/210 B; 24/73 P; 85/5 R; 166/82
[51] Int. Cl.² ......................................... E21B 33/08
[58] Field of Search ....... 15/210 B; 24/73 P; 85/5 R, 85/DIG. 2; 166/81–84; 175/84

[56] References Cited
UNITED STATES PATENTS

| | | | |
|---|---|---|---|
| 2,514,817 | 7/1950 | Wheaton et al. | 15/210 B |
| 2,568,247 | 9/1951 | Medearis | 15/210 B |
| 2,655,679 | 10/1953 | Grant | 15/210 B |
| 3,195,266 | 7/1965 | Onanian | 85/DIG. 2 |
| 3,444,776 | 5/1969 | Frizell | 85/51 |
| 3,486,205 | 12/1969 | Smith | 85/5 R X |
| 3,611,861 | 10/1971 | Schulze | 85/5 R |
| 3,651,545 | 3/1972 | Hara | 24/73 P |
| 3,733,655 | 5/1973 | Kolibar | 24/73 P |

*Primary Examiner*—Daniel Blum
*Attorney, Agent, or Firm*—Dowell & Dowell

[57] ABSTRACT

A dual wiper for oil well pipe and rod, and the like, made by stacking single wipers one above the other mutually separated by spacers, the improvement residing in the use of headed studs easily applied by a hammer blow while assembling the wipers in place around the well pipe with the studs also supporting the spacers in their desired locations, the single wipers being provided with annular series of holes shaped and aligned to receive the studs, and the diameters of the holes being such as to grip the studs tightly around their shanks after the heads of the studs have been driven therethrough.

4 Claims, 6 Drawing Figures

PATENTED SEP 2 1975　　　　　　　　　　　　　　　　　　　　3,902,215

DUAL PIPE WIPER MADE OF STACKED SINGLE WIPERS

FIELD OF THE INVENTION

This invention relates to rod and pipe wipers of the type used in oil wells and sometimes referred to as "Mud Savers", and more particularly relates to dual wipers made by joining two single wipers in stacked spaced relationships using improved joining means.

BACKGROUND AND PRIOR ART

It has long been the practice to use a wiper of the type having a radial slit extending from its central pipe-receiving hole outwardly through its diaphragm portion and its mounting ring portion so that the wiper can be warped open for application around a pipe already in place, but since such a wiper does not wipe properly in the vicinity of the radial slit, it has been the practice to stack two wipers with their slits extending in different radial directions so that the second wiper will wipe the side of the pipe missed near the slit of the first wiper. One-piece dual wipers have been made resembling the above description, but they are very heavy and awkward to apply and remove. Therefore, a number of securing means have been proposed so that two single wipers could be separately applied around a pipe or sucker rod, and subsequently secured together to form a dual wiper in which both single wipers are easily applied and removed and in which either wiper can be replaced individually without having to discard the other as would be the case with one-piece dual wipers.

The prior art shows single wipers bolted together as in Wheaton U.S. Pat. No. 2,514,817 and in Ballard U.S. Pat. No. 2,928,114; single wipers clamped together by wire clips as in Grant U.S. Pat. No. 3,392,416; and even rather specially shaped separate wiper halves held together by driven headed rubber studs as shown in Grant patent 2,655,679. Although such structures may seem to be simple and expedient wiper securing means, they suffer from serious disadvantages which the present invention seeks to overcome. The bolted structures are most difficult to assemble at a well site where the installed parts are foul with oil and mud, and slippery hands are inept at starting small nuts on bolts which later require tightening with wrenches, a slow process at best. The metal clip structures are easier and quicker to apply but would appear to be easily dislodged also, especially from an oily rubber member. The studs driven in a radial direction from the sides are awkward to start and require a specially molded rubber wiper in which the amount of rubber which must be added greatly increases the cost and weight of the product. Moreover, the bolts and spring clips used in two types of prior art assemblies suffer from a common fault, namely that they are made of metal which, when dropped accidentally into a well during assembly, become destructive foreign objects in the well tending to gouge and rip rubber seals, packers or cups operating in the well below.

THE INVENTION

This invention provides a dual wiper assembly made up of standard single wipers modified only slightly to provide an annular series of holes through the outer supporting ring of each wiper, and the assembly including headed studs easily driven through aligned holes by a series of hammer blows.

It is a major object of the invention to provide a dual wiper assembly which can be easily and conveniently installed in situ around well pipe or sucker rod by a few sharp hammer blows, and which provides a resulting dual wiper in which the individual wipers are always accurately spaced all the way around their joined peripheral supporting rings, as distinguished from being over-tightened and warped on one side and loose on the other side as may happen when bolts are used as the fasteners.

Another object of the invention is to provide a dual wiper with securing means which are quickly applied by a hammer blow delivered downwardly from above rather than horizontally inwardly from the sides.

Another major object is to provide a dual wiper assembly made up of ordinary single wipers which require only slight modification of the wiper, which can be easily accomplished after the wiper is molded by drilling it through a template, whereby no additional rubber or weight need be added to the wiper to adapt it for dual use.

A further object of the invention is to provide a dual wiper assembly in which the annular series of holes in the peripheral supporting rings of the wipers are countersunk to recess the heads of the securing studs below the surface of the supporting rings so that the wipers can lie flat on the annular well head seat on which they are supported.

Yet a further object of the invention is to provide novel securing means for securing together two single wipers wherein each securing means and each spacer can be made of one-piece construction, thereby providing fewer parts to be manipulated, assembled, and perhaps dropped or lost down the well.

Another object of the invention is to provide securing means that can be made of hard elastomeric material strong enough to serve their purpose, but at the same time easily ground up and thereby rendered harmless when accidentally dropped down a well.

Other objects and advantages of the invention will become apparent during the following discussion of the drawing, wherein:

THE DRAWINGS

Figure 1:
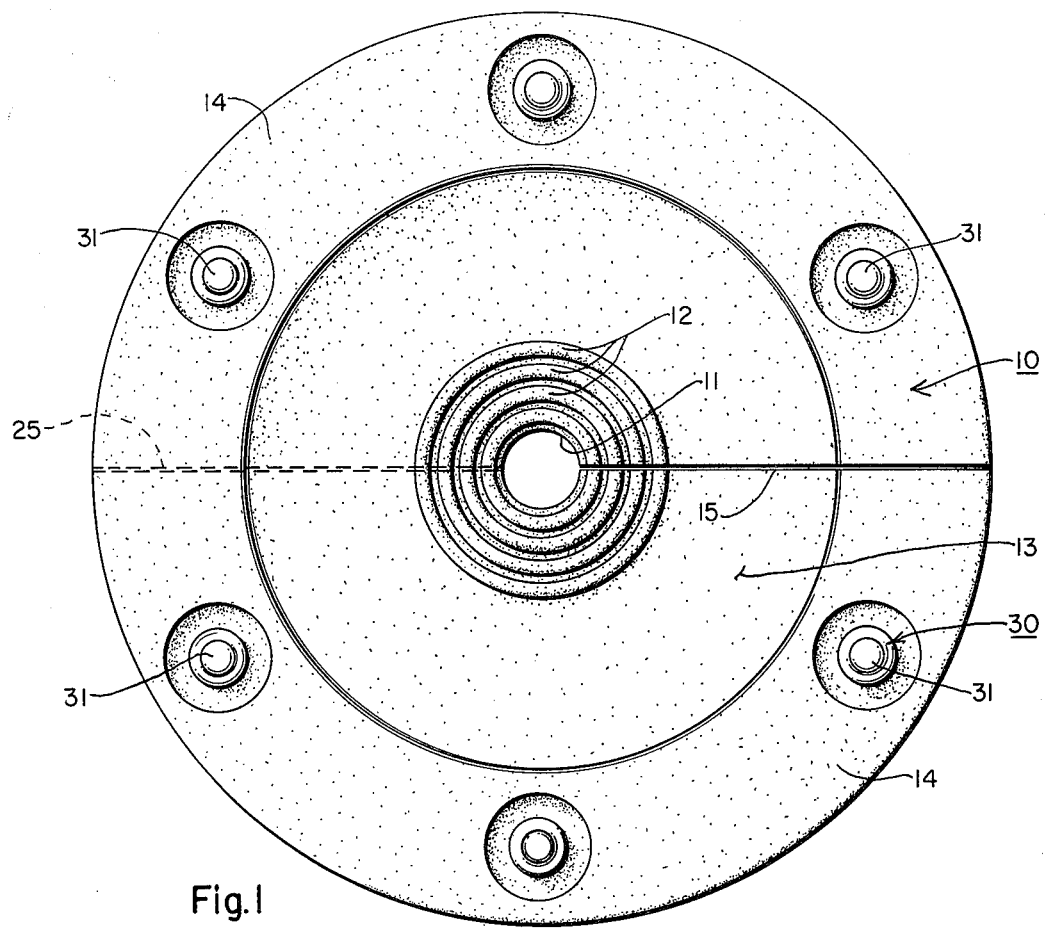
FIG. 1 is a plan view of a dual wiper assembly made according to the invention.
Figure 2:
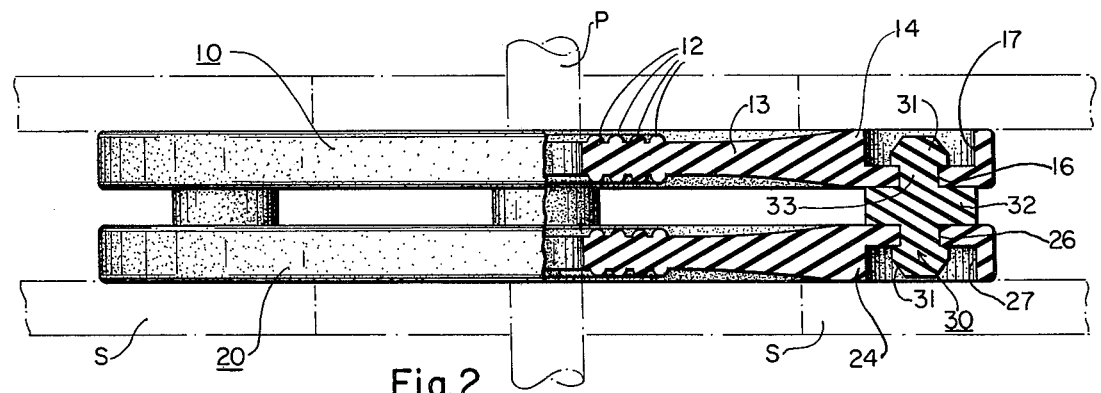
FIG. 2 is an elevation view of the wiper assembly shown in FIG. 1, but having one side of the assembly shown in cross-section.

Referring now to the drawing, FIGS. 1 and 2 show a dual wiper assembly according to the invention, comprising two single wipers 10 and 20 disposed in stacked relationship for the purpose of wiping the surface of well pipe P, or sucker rod passing through the wipers, which are supported on a suitable seat S at the well head. The upper wiper 10 shown in FIG. 1 is typical of both wipers and includes a central pipe receiving hole 11, surrounded by wiping rings 12 near inner periphery of the wiper, the rings being surrounded by a flexible diaphragm portion 13 which in turn joins an annular supporting ring portion 14. The lower wiper 20 has similar portions including a supporting ring portion 24, and both wipers are slit radially in the manner well known in the prior art, the slit in the upper wiper being labelled 15 and the slit in the lower wiper being labelled 25, and these slits being rotated out of alignment with each other in the dual assembly.

The annular supporting rings 14 and 24 of the wipers are provided with annular series of mutually aligned holes labelled 16 in the upper wiper and 26 in the lower wiper. These holes are countersunk at one upper surface of each wiper as at 17 and 27. Countersinking in this manner is desirable so that the wipers can lie flush on the seats S with the heads 31 of the fasteners recessed.

The fasteners are shown in several modified forms. For instance, FIG. 2 shows fasteners which comprise a long stud 30 having a head 31 at each end and having a spacer 32 permanently attached to the mid-portion of the shank 33 of the fastener so that the stud and the spacer are one-piece and accordingly easier to handle than if they were separate.

Figure 3:
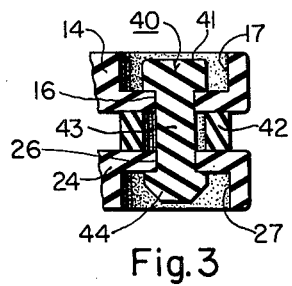
FIG. 3 is a partial sectional view similar to the right-hand side of FIG. 2, but showing a modified form of fastener stud and separately formed cylindrical spacer.
Figure 4:
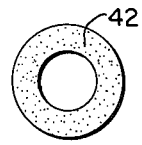
FIG. 4 is an end view of the spacer shown in FIG. 3.

FIGS. 3 and 4 show a stud 40 and spacer 42 which are made separately and therefore somewhat cheaper to manufacture. The stud 40 also has heads 41 at both ends of its shank 43.

Figure 5:
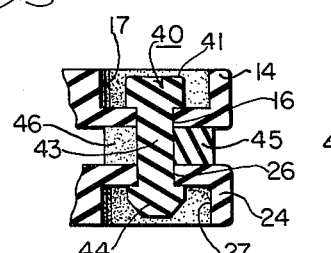
FIG. 5 is a partial sectional view similar to the right-hand side of FIG. 2, but showing a further modified form of fastener stud and separately formed C-shaped spacer.
Figure 6:
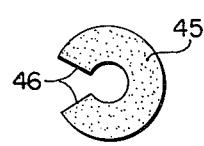
FIG. 6 is an end view of the C-shaped spacer shown in FIG. 5.

FIGS. 5 and 6 show a further modification in which the stud 40 is similar to that shown in FIG. 3, but the spacer 45 is C-shaped in cross-section as shown in FIG. 6, leaving an opening 46 which is normally narrower than the shank 43 of the stud but wide enough so that the spacer 45 can be snapped onto the shank 43 of the stud 40 after the latter is fully or partially driven into the holes 16 and 26 in the wipers. The heads of the studs can be tapered at both ends as at 31 in FIG. 2 to facilitate driving in either direction, or they can be tapered only at one end as at 44 in FIGS. 3 and 5 so that they will be installed by driving through both wipers in the same direction.

As stated above, it is desirable that the studs and spacers be made of a material capable of being ground up if they should accidentally fall down into the well. Hard rubber, or an appropriate plastic material is useful for this purpose.

The invention is not to be limited to the exact forms shown in the drawing for obviously changes can be made within the scope of the following claims, for instance, by lengthening the mounting studs or by providing more holes around the mounting rings of the wipers and then adding a third pipe wiper to the assembly of two stacked wipers to provide a three-wiper assembly.

We claim:

1. A dual wiper for oil well pipe, comprising:
   a. two similar elastomeric pipe wipers juxtaposed one above the other and each including a flexible wiping diaphragm having a pipe receiving hole through its center and having a surrounding elastomeric mounting ring thickened to make it semi-rigid, each wiper having a radial slit extending from its periphery to its hole, and the slits being mutually oppositely disposed, and the mounting rings of each wiper having an annular series of holes therethrough disposed parallel to said pipe receiving hole and each hole including a smaller diameter portion and an enlarged countersunk portion, and the holes in the two rings mutually registering in alignment with each other with the counter-sunk portions of the holes in the respective wipers facing away from each other when the wipers are stacked;
   b. spacer means made of semi-rigid elastomeric material located between the wipers at the holes for spacing the mounting rings apart; and
   c. studs made of semi-rigid elastomeric material and having enlarged heads at both ends annularly tapered towards their ends to facilitate driving and the heads being loosely receivable in the countersunk portions of the holes recessed below the wiper surfaces, and each stud having a shank of diameter which is snug in the smaller diameter portions of the holes of said series, the studs having their heads driven through the smaller portions into the countersunk portions of said aligned holes, and the shanks being of such length as to hold the mounting rings tightly against the spacer means.

2. A dual wiper as set forth in claim 1, wherein each spacer means comprises a cylindrical member having opposite ends abutting the mounting rings and having a central bore receiving a stud therethrough.

3. A dual wiper as set forth in claim 1, wherein each spacer means comprises an annular enlargement around the shank of a stud spaced equally from the heads at the opposite ends thereof.

4. A dual wiper as set forth in claim 1, wherein each spacer means comprises a C-shaped member having opposite ends abutting the mounting rings and having a central bore snugly receiving the shank of a stud.

* * * * *